United States Patent Office 3,370,048
Patented Feb. 20, 1968

3,370,048
PROCESS FOR THE PREPARATION OF NEW LINEAR CONDENSATION POLYMERS
Delbert D. Reynolds, Rochester, N.Y., assignor to Eastman Kodak Company, Rochester, N.Y., a corporation of New Jersey
No Drawing. Filed Mar. 15, 1965, Ser. No. 439,975
14 Claims. (Cl. 260—79.3)

ABSTRACT OF THE DISCLOSURE

Resinous linear condensation polymers prepared by reacting certain bisalkoxymethylamines with bifunctional compounds such as aliphatic glycols, dithiols, thioalcohols, thioamines, secondary diamines, and the like, and quaternary salts of said polymers.

---

This invention relates to resinous linear condensation polymers prepared by reacting certain bisalkoxymethylamines with bifunctional compounds such as aliphatic glycols, dithiols, thioalcohols, thioamines, secondary diamines, and the like.

The new resinous polymers of the invention include those represented by the following structures:

I. $[-R-CH_2N\underset{CH_2CH_2}{\overset{CH_2CH_2}{\diagup\diagdown}}NCH_2-]_n$ II. $[-R_1-CH_2\overset{R_2}{\underset{\oplus}{N}}\underset{CH_2CH_2}{\overset{CH_2CH_2}{\diagup\diagdown}}\overset{R_2}{\underset{\oplus}{N}}CH_2-]_n$
$\qquad X^\ominus \qquad X^\ominus$ III. $[-R-CH_2\overset{R_2}{\underset{|}{N}}(CH_2)_m\overset{R_2}{\underset{|}{N}}CH_2-]_n$ IV. $[-R_1-CH_2\overset{R_2}{\underset{\underset{R_2}{\overset{\oplus}{\diagup}}}{N}}(CH_2)_m\overset{R_2}{\underset{\underset{R_2}{\overset{\oplus}{\diagup}}}{N}}CH_2-]_n$
$\qquad X^\ominus \qquad X^\ominus$ V. $[-R-CH_2\overset{R_2}{\underset{|}{N}}CH_2-]_n$ VI. $[-R_1-CH_2\underset{\underset{R_2}{\diagup\oplus}}{\overset{R_2}{N}}-CH_2]_n \quad X^\ominus$ wherein each m represents an integer of 2–14, each n represents a whole number from about 20 to 5000, each $R_2$ represents an alkyl group having 1–10 carbon atoms, e.g., methyl, ethyl, propyl, isopropyl, butyl, isobutyl, amyl, hexyl, decyl, etc. groups, each X represents an acid anion, e.g., chloride, bromide, iodide, perchlorate, p-toluene-sulfonate (pts.), methyl sulfate, ethyl sulfate, etc., each R represents a group selected from those having the structures:

$-A(CH_2)_mA-, \quad -A(CH_2)_mN\underset{CH_2CH_2}{\overset{CH_2CH_2}{\diagup\diagdown}}N(CH_2)_mA-$ $-ACH_2CH_2(ACH_2CH_2)_{d-1}A-, \quad -ACH_2-\!\!\bigcirc\!\!-CH_2A-$ $-A(CH_2)_m\overset{R_2}{\underset{|}{N}}-, \quad -\overset{R_2}{\underset{|}{N}}(CH_2)_m\overset{R_2}{\underset{|}{N}}- \text{ and } -N\underset{CH_2CH_2}{\overset{CH_2CH_2}{\diagup\diagdown}}N-$ wherein each m and $R_2$ are as previously defined, d represents an integer of 1–3, each A represents an atom of oxygen or sulfur, and each $R_1$ represents a group selected from those having the structures:

$-A(CH_2)_mA-, \quad -A(CH_2)_m\overset{R_2}{\underset{\oplus}{N}}\underset{CH_2CH_2}{\overset{CH_2CH_2}{\diagup\diagdown}}\overset{R_2}{\underset{\oplus}{N}}(CH_2)_mA-$
$\qquad\qquad X^\ominus \qquad X^\ominus$ $-ACH_2CH_2(ACH_2CH_2)_{d-1}A-, \quad -ACH_2-\!\!\bigcirc\!\!-CH_2A-$ $-A(CH_2)_m\overset{R_2}{\underset{\underset{R_2}{\overset{\oplus}{\diagup}}}{N}}-, \quad -\overset{R_2}{\underset{\underset{R_2}{\overset{\oplus}{\diagup}}}{N}}(CH_2)_m\overset{R_2}{\underset{\underset{R_2}{\overset{\oplus}{\diagup}}}{N}}-$
$\quad X^\ominus \qquad X^\ominus \qquad X^\ominus$ and $\overset{\oplus}{\underset{R_2}{N}}\underset{CH_2CH_2}{\overset{CH_2CH_2}{\diagup\diagdown}}\overset{\oplus}{\underset{R_2}{N}}-$
$X^\ominus \qquad X^\ominus$ wherein $d$, $m$, $R_2$, X and A are as previously defined.

The resinous condensation polymers of the invention as defined above range from viscous syrups and waxy materials to hard white powders. Their average molecular weight range about from 2000 to 600,000. The unquaternized members, and especially those where A is restricted to oxygen atoms, are useful as hardeners for gelatin, i.e. they increase the resistance of gelatin layers to swelling in water as compared with gelatin containing no hardener. Also, the melting points of the gelatin layers are thereby materially elevated. This makes the unquaternized polymers of the invention particularly useful as components in photographic gelatino-silver halide emulsion and layers. Certain of such advantageous gelatin-hardener compositions are described and claimed in copending application of D. D. Reynolds et al., Ser. No. 220,031 filed Aug. 28, 1962. The quaternized members do not function as gelatin hardeners, but have utility as useful chemical sensitizers in photographic silver halide emulsions. They are soluble in water, lower aliphatic alcohols, chloroform, etc. While all of the polymers of the invention are useful either as hardeners for gelatin or as sensitizers as explained herein, those containing the piperazine nucleus are especially efficacious and are preferred.

It is, accordingly, an object of the invention to provide a new class of resinous linear condensation polymers that are useful either as gelatin hardeners or chemical sensitizers for photographic silver halide emulsions. Another object is to provide methods for preparing these polymers. Other objects will become apparent hereinafter.

In accordance with the invention, I prepare my new polymers by heating approximately equimolar proportions of (1) a bisalkoxymethylamine including those selected from the group represented by the structures:

VII. $R_3OCH_2N\underset{CH_2CH_2}{\overset{CH_2CH_2}{\diagup\diagdown}}NCH_2OR_3$ VIII. $R_3OCH_2\overset{R_2}{\underset{|}{N}}(CH_2)_m\overset{R_2}{\underset{|}{N}}CH_2OR_3$ IX. $R_3OCH_2\overset{R_2}{\underset{|}{N}}CH_2OR_3$ wherein m and $R_2$ are as previously defined and $R_3$ represents an alkyl group having 1–6 carbon atoms, e.g., methyl, ethyl, isopropyl, butyl, etc., groups, with (2)

a bifunctional compound including those selected from the group represented by the structures:

X. $\quad HA(CH_2)_mAH$

XI. 
$$HA(CH_2)_mN\begin{matrix}CH_2CH_2\\ \\ CH_2CH_2\end{matrix}N(CH_2)_mAH$$

XII. $\quad HACH_2CH_2(ACH_2CH_2)_{d-1}AH$

XIII. $\quad HACH_2-\!\!\left\langle\;\right\rangle\!\!-CH_2AH$

XIV. $\quad HA(CH_2)_mNHR_2$

XV. $\quad R_2HN(CH_2)_mNHR_2$ and piperazine, wherein $m$, $R_2$ and A are previously defined, until polymerization is substantially complete, after which the polymeric product is separated from the reaction mixture by conventional means, e.g., by removing the byproducts formed in the reaction by evaporation or distillation, washing the residual polymer and drying. Advantageously, the polymerization is completed in many instances under vacuum conditions. The temperature for the reaction can range widely, but preferably from about 30–200° C. Where the reaction is exothermic, external cooling is used to keep the temperature below 60° C. in the initial phase, followed by heating at higher temperatures in the final phase. Where oxidation is a factor, the reaction is advantageously carried out in an inert atmosphere, e.g., under nitrogen.

For preparing the corresponding quaternary salts of the invention, the polymers are treated in an inert solvent, e.g. chloroform, with an equivalent amount, i.e., stoichiometrically calculated amount, of a quaternizing agent $R_2X$ (wherein $R_2$ and X are as previously defined) such as an alkyl halide, e.g., methyl bromide, ethyl iodide, etc., a dialkyl sulfate, e.g., dimethyl sulfate, diethyl sulfate, etc., an alkyl arylsulfonate, e.g., methyl p-toluenesulfonate, methyl benzenesulfonate, etc., and the like, and the resultant salt isolated by precipitation into a nonsolvent, e.g. ether.

PREPARATION OF INTERMEDIATES

The compounds coming under structures VII, VIII and IX above are conveniently prepared by reacting an amine either a simple or polyfunctional amine with formaldehyde in the presence of an appropriate alcohol, in the proportions of approximately 2 moles of the formaldehyde and as much or more of the alcohol to each mole of the amine. The following examples are illustrative.

(A) *1,4-bis(isobutoxymethyl)piperazine*

To a refluxing mixture of 20 moles of paraformaldehyde and 2 l. of isobutyl alcohol was added slowly 10 moles of piperazine dissolved in 4 l. of isobutyl alcohol. The solution was then refluxed and the water removed as a water-alcohol azeotrope. The product was isolated by distillation through a 16″ silvered Vigreux column under reduced pressure. B.P. 110° C./2 mm., $N_D^{25}$ 1.4473.

In place of the isobutyl alcohol, there can be substituted in the above example a like amount of methanol, ethanol, propanol, etc., to give the corresponding compounds 1,4-bis(methoxymethyl) piperazine, 1,4-bis(ethoxymethyl) piperazine, 1,4-bis(propoxymethyl) piperazine, etc.

(B) N,N-*bis(isobutoxymethyl) methylamine*

To a stirred suspension of 10 moles of paraformaldehyde and 1.5 l. of isobutyl alcohol was added slowly 5 moles of methylamine in 40 percent aqueous solution. This solution was then refluxed and the water removed as a water-alcohol azeotrope. The product was isolated by distillation through an 8 in. Vigreux column under reduced pressure. B.P. 60° C./1.5 mm., $N_D^{25}$ 1.4168.

*Analysis.*—Calcd. for $C_{11}H_{25}NO_2$: C, 65.0; H, 12.3; N, 6.9. Found: C, 64.8; H, 12.7; N, 7.2.

In place of the methylamine, there can be substituted in the above example, a like amount of ethylamine, n-propylamine, n-butylamine to give the corresponding compounds N,N-bis(isobutoxymethyl) ethylamine, N,N-bis(isobutoxymethyl) n-propylamine, N,N-bis(isobutoxymethyl) n-butylamine, etc. Also, the isobutyl alcohol can be replaced with methanol, ethanol, n-propanol, n-butanol, etc., to give the corresponding compounds, e.g. N,N-bis(ethoxymethyl) methylamine, N,N-bis(ethoxymethyl) n-butylamine, etc.

(C) N,N'-*bis(ethoxymethyl)*-N,N'-*di-n-propylhexamethylene diamine*

To a refluxing mixture of 4 moles of paraformaldehyde, 700 ml. of ethanol, and 700 ml. of benzene was added slowly 2 moles of N,N'-di-n-propylhexamethylene diamine. The solution was then refluxed and the water removed as a water-alcohol-benzene azeotrope. The product was isolated by distillation in a stirred pot under reduced pressure. B.P. 121° C./0.025 mm., $N_D^{25}$ 1.4480.

*Analysis.*—Calcd. for $C_{18}H_{40}N_2O_2$: C, 68.4; H, 12.7; N, 8.8. Found: C, 68.1; H, 12.8; N, 9.2.

(D) N,N'-*bis(ethoxymethyl)*-N,N'-*diisobutylhexamethylene diamine*

To a refluxing mixture of 2 moles of paraformaldehyde, 500 ml. of ethanol, and 500 ml. of benzene was added slowly 1 mole of N,N'-diisobutylhexamethylene diamine. The solution was then refluxed and the water removed as a water-alcohol-benzene azeotrope. The product was then isolated by distillation in a stirred pot under reduced pressure. B.P. 118° C./0.033 mm., $N_D^{25}$ 1.4425.

*Analysis.*—Calcd. for $C_{20}H_{44}N_2O_2$: C, 69.8; H, 12.8; N, 8.1. Found: C, 69.9; H, 13.1; N, 8.4.

(E) N,N'-*bis(ethoxymethyl)*-N,N'-*di-n-butylhexamethylene diamine*

To a refluxing mixture of 3 moles of paraformaldehyde, 500 ml. of ethanol, and 500 ml. of benzene was added dropwise 1.5 moles of N,N'-di-n-butylhexamethylene diamine. The solution was refluxed and the water removed as a water-alcohol-benzene azeotrope. The product was isolated by distillation in a 1.5 inch x 6-inch brush still under reduced pressure. B.P. 150° C./0.025 mm., $N_D^{25}$ 1.4495.

*Analysis.*—Calcd. for $C_{20}H_{44}N_2O_2$: C, 69.8; H, 12.8; N, 8.1. Found: C, 70.0; H, 13.1; N, 8.3.

(F) *1,4-bis(n-butoxymethyl)piperazine*

420 grams of piperazine were mixed with 300 g. of paraformaldehyde in 3 liters of n-butanol and the mixture was refluxed. The water formed during the reaction was removed as a n-butanol-water azeotrope by means of a trap. When water was no longer formed, the product was distilled. Obtained thereby was 1,4-bis(n-butoxymethyl) piperazine ($C_{14}H_{30}N_2O_2$).

By following the above procedures, other of the bisalkoxymethylamines within the scope of the invention can be prepared. The intermediates coming under structures X to XV above which are condensed with the bisalkoxymethylamines to form the polymers of the invention are well-known compounds.

The following examples will serve further to illustrate the invention.

EXAMPLE 1

This example illustrates the polymers of the invention having the general structure (a)
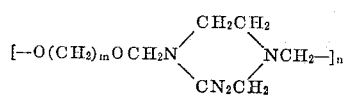

and

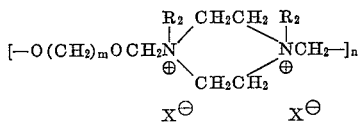

wherein $m$, $n$, $R_2$ and X are as previously defined.

*General procedure.*—One mole of $HO(CH_2)_mOH$ was stirred with one mole of 1,4-bis(ethoxymethyl)piperazine for 1 hour under $N_2$ at 135° C. The ethanol was removed during the reaction by distillation. After 1 hour a vacuum pump was attached to the reaction flask and the polymerization continued for 6 hours.

A viscous product resulted. Upon cooling to room temperature, it hardened to a crystalline wax-like product.

The quaternization was effected by reacting the polymer with two equivalents of methyl p-toluenesulfonate in chloroform at 25° C. After 24 hours' reaction time, the quaternized polymer was precipitated by adding the chloroform solution to rapidly stirred ether. In each case a very hydroscopic, water-soluble polymer was obtained. Analytical data is shown in Table I below.

(b)

and $$[-O(CH_2)_mOCH_2\overset{R_2}{\underset{\underset{X^\ominus}{\overset{\oplus}{R_2}}}{N}}(CH_2)_m\overset{R_2}{\underset{\underset{X^\ominus}{\overset{\oplus}{R_2}}}{N}}CH_2-]_n$$

wherein $m$, $n$, $R_2$ and X are as previously defined.

The procedure is the same as under 1(a) above, except that N,N'-bis(ethoxymethyl) - N,N' - dimethylhexamethylene diamine and the corresponding N,N'-bis(2-methylpropyl) compound were used in place of the 1,4-bis(ethoxymethyl)piperazine. Also, the quaternization of the viscous polymer with methyl p-toluenesulfonate differed in that it was effected by refluxing in chloroform for 3 hours. A very hygroscopic, water-soluble polymer resulted in each case. Analytical data are shown in Table 1(b).

TABLE I(a)

| No. | Polymer | | Analysis, Wt. Percent | | | |
|---|---|---|---|---|---|---|
| | | | C | H | N | S |
| 1 | $[-O(CH_2)_2OCH_2N\underset{CH_2CH_2}{\overset{CH_2CH_2}{\diagup\diagdown}}NCH_2-]_n$ | Calcd<br>Found | 55.8<br>55.2 | 9.3<br>9.2 | 16.3<br>16.3 | -------<br>------- |
| 2 | $[-O(CH_2)_2OCH_2\overset{CH_3}{\underset{\oplus}{N}}\underset{CH_2CH_2}{\overset{CH_2CH_2}{\diagup\diagdown}}\overset{CH_3}{\underset{\oplus}{N}}CH_2-]_n$ 2 pts$^\ominus$ | Calcd<br>Found | 53.0<br>51.9 | 6.6<br>7.0 | 5.2<br>6.6 | 11.8<br>9.9 |
| 3 | $[-O(CH_2)_4OCH_2N\underset{CH_2CH_2}{\overset{CH_2CH_2}{\diagup\diagdown}}NCH_2-]_n$ | Calcd<br>Found | 60.0<br>60.2 | 10.0<br>10.5 | 14.0<br>13.6 | -------<br>------- |
| 4 | $[-O(CH_2)_4OCH_2\overset{CH_3}{\underset{\oplus}{N}}\underset{CH_2CH_2}{\overset{CH_2CH_2}{\diagup\diagdown}}\overset{CH_3}{\underset{\oplus}{N}}CH_2-]_n$ 2 pts$^\ominus$ | Calcd<br>Found | 54.5<br>54.2 | 7.0<br>7.4 | 4.9<br>6.1 | 11.2<br>8.7 |
| 5 | $[-O(CH_2)_6OCH_2N\underset{CH_2CH_2}{\overset{CH_2CH_2}{\diagup\diagdown}}NCH_2-]_n$ | Calcd<br>Found | 63.2<br>63.0 | 10.5<br>10.9 | 12.3<br>12.2 | -------<br>------- |
| 6 | $[-O(CH_2)_6OCH_2\overset{CH_3}{\underset{\oplus}{N}}\underset{CH_2CH_2}{\overset{CH_2CH_2}{\diagup\diagdown}}\overset{CH_3}{\underset{\oplus}{N}}CH_2-]_n$ 2 pts$^\ominus$ | Calcd<br>Found | 56.0<br>55.6 | 7.3<br>7.6 | 4.7<br>5.8 | 10.6<br>8.7 |
| 7 | $[-O(CH_2)_{10}OCH_2N\underset{CH_2CH_2}{\overset{CH_2CH_2}{\diagup\diagdown}}NCH_2-]_n$ | Calcd<br>Found | 67.6<br>67.6 | 11.3<br>11.1 | 9.9<br>9.5 | -------<br>------- |
| 8 | $[-O(CH_2)_{10}OCH_2\overset{CH_3}{\underset{\oplus}{N}}\underset{CH_2CH_2}{\overset{CH_2CH_2}{\diagup\diagdown}}\overset{CH_3}{\underset{\oplus}{N}}CH_2-]_n$ 2 pts$^\ominus$ | Calcd<br>Found | 58.6<br>59.6 | 7.9<br>7.9 | --------<br>-------- | 9.8<br>7.4 | pts=p-toluenesulfonate anion.

TABLE I(b)

| No. | Polymer | | C | H | N | S |
|---|---|---|---|---|---|---|
| | | | \multicolumn{4}{c}{Analysis, Wt. Percent} |
| 1 | $[-O(CH_2)_6OCH_2\underset{CH_3}{\overset{|}{N}}(CH_2)_6\underset{CH_3}{\overset{|}{N}}CH_2-]_n$ | Calcd<br>Found | 67.2<br>67.3 | 12.0<br>12.3 | 9.8<br>9.8 | -------<br>------- |
| 2 | $[-O(CH_2)_6OCH_2\underset{CH_3}{\overset{CH_3}{\overset{|}{N}^\oplus}}(CH_2)_6\underset{CH_3}{\overset{CH_3}{\overset{|}{N}^\oplus}}CH_2-]_n$   2pts$^\ominus$ | Calcd<br>Found | 58.3<br>57.7 | 8.3<br>8.2 | 4.3<br>4.0 | 9.7<br>9.6 |
| 3 | $\left[\underset{-O(CH_2)_4OCH_2\overset{|}{N}(CH_2)_6\overset{|}{N}CH_2-}{(CH_3)_2CHCH_2 \quad CH_2CH(CH_3)_2}\right]_n$ | Calcd<br>Found | 70.1<br>70.0<br>69.7 | 12.3<br>12.2<br>12.3 | 8.2<br>9.5<br>9.1 | -------<br>-------<br>------- |
| 4 | $\left[\underset{CH_3 \quad\quad CH_3 \quad 2pts^\ominus}{-O(CH_2)_4OCH_2\overset{(CH_3)_2CHCH_2}{\overset{|}{N}^\oplus}(CH_2)_6\overset{CH_2CH(CH_3)_2}{\overset{|}{N}^\oplus}CH_2-}\right]_n$ | Calcd<br>Found | 60.5<br>59.1<br>59.1 | 8.8<br>8.3<br>8.2 | 3.9<br>4.2<br>------ | 8.9<br>9.0<br>------ |

EXAMPLE 2

This example illustrates the polymers of the invention having the general structures:

(a)

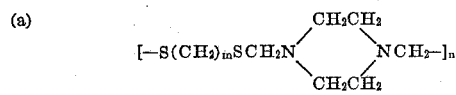

and

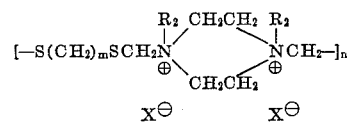

wherein $m$, $n$, $R_2$ and $X$ are as previously defined.

*General procedure.*—These polymerizations are exothermic and therefore require no external heating.

One mole of $HS(CH_2)_mSH$ is mixed with one mole of 1,4-bis(ethoxymethyl)piperazine. The reaction temperature is kept below 60° by external cooling, if necessary. As the polymerization proceeds the reaction mixture becomes hazy and then more and more pasty until it sets to a hard, white polymer. At this point it is ground to a powder and heated in oil bath at 135° while a vacuum is applied to remove the ethanol.

Quaternization is effected by two equivalents of methyl p-toluenesulfonate in chloroform. The polymer is isolated by precipitation in ether. Analytical data is given in Table II(a).

TABLE II(a)

| No. | Polymer | | C | H | N | S |
|---|---|---|---|---|---|---|
| | | | \multicolumn{4}{c}{Analysis, Wt. Percent} |
| 1 | $[-S(CH_2)_3SCH_2N\underset{CH_2CH_2}{\overset{CH_2CH_2}{\diagup\diagdown}}NCH_2-]_n$ | Calcd<br>Found | 49.6<br>49.8 | 8.3<br>8.4 | 12.8<br>12.5 | 29.4<br>29.3 |
| 2 | $[-S(CH_2)_3SCH_2\overset{CH_3}{\underset{\oplus}{N}}\underset{CH_2CH_2}{\overset{CH_2CH_2}{\diagup\diagdown}}\overset{CH_3}{\underset{\oplus}{N}}CH_2-]_n$   CO$_3$   2 pts$^\ominus$ | Calcd<br>Found | --------<br>-------- | --------<br>-------- | --------<br>-------- | 21.7<br>21.3 |
| 3 | $[-S(CH_2)_5SCH_2N\underset{CH_2CH_2}{\overset{CH_2CH_2}{\diagup\diagdown}}NCH_2-]_n$ | Calcd<br>Found | 53.7<br>53.3 | 8.9<br>8.8 | 11.4<br>11.1 | 26.0<br>25.7 |
| 4 | $[-S(CH_2)_5SCH_2\overset{CH_3}{\underset{\oplus}{N}}\underset{CH_2CH_2}{\overset{CH_2CH_2}{\diagup\diagdown}}\overset{CH_3}{\underset{\oplus}{N}}CH_2-]_n$   2 pts$^\ominus$ | Calcd<br>Found | 52.4<br>50.3 | 6.8<br>7.1 | 4.5<br>6.1 | 20.7<br>20.6 |
| 5 | $[-S(CH_2)_6SCH_2\overset{CH_3}{\underset{\oplus}{N}}\underset{CH_2CH_2}{\overset{CH_2CH_2}{\diagup\diagdown}}\overset{CH_3}{\underset{\oplus}{N}}CH_2-]_n$   2pts$^\ominus$ | Calcd<br>Found | 53.2<br>52.8 | 7.0<br>7.3 | 4.4<br>4.3 | 20.3<br>19.9 |
| 6 | $[-S(CH_2)_6SCH_2N\underset{CH_2CH_2}{\overset{CH_2CH_2}{\diagup\diagdown}}NCH_2-]_n$ | Calcg<br>Found | 55.4<br>55.8 | 9.2<br>9.6 | 10.8<br>10.6 | 24.6<br>24.3 |
| 7 | $[-S(CH_2)_6SCH_2N\underset{CH_2CH_2}{\overset{CH_2CH_2}{\diagup\diagdown}}NCH_2-]_n$ | Calcd<br>Found_g_ | 47.0<br>47.4 | 7.8<br>8.1 | 13.7<br>14.0 | --------<br>-------- |
| 8 | $[-S(CH_2)_{10}SCH_2N\underset{CH_2CH_2}{\overset{CH_2CH_2}{\diagup\diagdown}}NCH_2-]_n$ | Calcd<br>Found | 60.9<br>60.8 | 10.1<br>10.2 | 8.9<br>9.0 | --------<br>-------- | pts = p-toluenesulfonate anion.

(b)

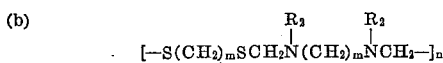

and

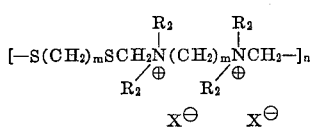

wherein $m$, $n$, $R_2$ and X are as previously defined.

*General procedure.*—This polymerization is initially

*Preparation.*—One mole of 4-hydroxybutanethiol mixed with one mole of 1,4-bis(isobutoxymethyl)piperazine. The reaction is exothermic. Cooled externally to keep the temperature below 60° C. After the initial reaction the viscous mixture was stirred for one hour at 135° C. under nitrogen. Then a water pump was attached to the system and polymerization continued under vacuum for 2 hours.

The quaternization was conducted in refluxing chloroform with methyl p-toluenesulfonate. Precipitation was in ether. The quaternary polymer is a taffy-like, methanol-soluble material.

TABLE III(a)

| No. | Polymer | | Analysis, Wt. Percent | | | |
|---|---|---|---|---|---|---|
| | | | C | H | N | S |
| 1 | [—S(CH$_2$)$_4$OCH$_2$N⟨CH$_2$CH$_2$/CH$_2$CH$_2$⟩NCH$_2$—]$_n$ | Calcd | 55.6 | 9.3 | 12.9 | 14.8 |
| | | Found | 54.2 | 9.2 | 11.0 | 15.1 |
| 2 | [—S(CH$_2$)$_4$OCH$_2$N$^{CH_3}$⊕⟨CH$_2$CH$_2$/CH$_2$CH$_2$⟩⊕N$^{CH_3}$CH$_2$—]$_n$ 2 pts$^{\ominus}$ | Calcd | 53.1 | 6.8 | 4.8 | 16.3 |
| | | Found | 50.7 | 6.9 | 4.1 | 20.6 | pts=p-toluenesulfonate anion.

slightly exothermic. One-tenth mole of HS(CH$_2$)$_3$SH was stirred with 0.1 mole of N,N'-bis(ethoxymethyl)-N,N-dimethylhexamethylene diamine for one hour under N$_2$ at 125° C., followed by 4 hours under water pump vacuum at 125° C. Ethanol distilled off. A very viscous polymer resulted.

The quaternization was effected by heating the polymer with two gram-mole equivalents of methyl p-toluenesulfonate in chloroform for 3 hours. The very viscous quaternary salt which separated as a second phase was dissolved in ethanol and precipitated into rapidly stirred ether as a white, granular, hygroscopic, water-soluble product. Analytical data are given in the following Table II(*b*).

(b)

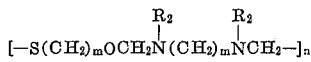

and

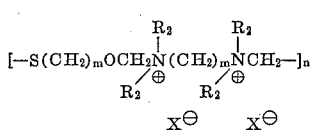

wherein $m$, $n$, $R_2$ and X are as previously defined.

TABLE II(b)

| No. | Polymer | | Analysis, Wt. Percent | | | |
|---|---|---|---|---|---|---|
| | | | C | H | N | S |
| 1 | [—S(CH$_2$)$_3$SCH$_2$N$^{CH_3}$(CH$_2$)$_6$N$^{CH_3}$CH$_2$—]$_n$ | Calcd | 60.4 | 10.8 | 8.8 | 20.0 |
| | | Found | 57.7 | 10.4 | 5.5 | 22.4 |
| 2 | [—S(CH$_2$)$_3$SCH$_2$N$^{CH_3}$⊕(CH$_2$)$_6$N⊕$^{CH_3}$CH$_2$—]$_n$ ĊH$_3$ ĊH$_3$ 2 pts$^{\ominus}$ | Calcd | 55.6 | 7.9 | 4.1 | 18.5 |
| | | Found | 52.3 | 7.1 | 4.0 | 20.2 | pts=p-toluenesulfonate.

EXAMPLE 3

This example illustrates the polymers of the invention having the general structures:

(a)

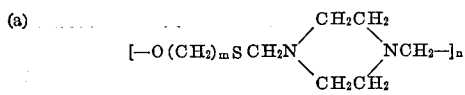

and

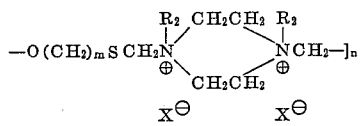

wherein $m$, $n$, $R_2$ and X are as previously defined.

*Preparation.*—This polymerization is initially slightly exothermic. One-tenth mole of HS(CH$_2$)$_4$OH was stirred with 0.1 mole of N,N'-bis(ethoxymethyl)-N,N'-dimethylhexamethylene diamine for 7 hours under N$_2$ at 125° C., and then for 6 hours under water pump vacuum at 125° C. A very viscous polymer resulted.

The quaternization was effected in refluxing chloroform with methyl p-toluenesulfonate. Precipitation was in ether. The quaternary polymer was a very viscous, water-soluble material. Analytical data are shown in Table III(*b*) below.

TABLE III(b)

| No. | Polymer | | C | H | N | S |
|---|---|---|---|---|---|---|
| | | | \multicolumn{4}{c}{Analysis, Wt. Percent} |
| 1 | [—S(CH$_2$)$_4$OCH$_2$N̈(CH$_2$)$_6$N̈CH$_2$—]$_{n2}$ (with CH$_3$, CH$_3$ substituents) | Calcd | 63.6 | 11.3 | 9.3 | 10.6 |
| | | Found | 56.5 | 10.6 | 9.1 | 15.0 |
| 2 | [—S(CH$_2$)$_4$OCH$_2$N$^\oplus$(CH$_2$)$_6$N$^\oplus$CH$_2$—]$_n$ (with CH$_3$, CH$_3$ substituents) 2 pts$^\ominus$ | Calcd | 57.0 | 8.0 | 4.1 | 14.3 |
| | | Found | 52.3 | 7.5 | 3.6 | 16.3 | pts = p-toluenesulfonate anion.

EXAMPLE 4

This example illustrates the polymers of the invention having the general structures:

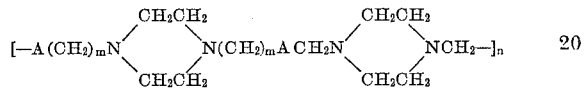

and

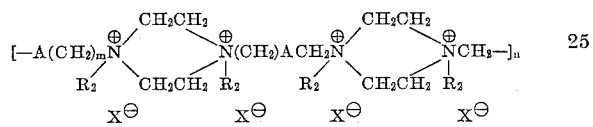

wherein m, n and R$_2$ are as previously defined and each A is an atom selected from oxygen or sulfur.

*Preparation: (Each A=Oxygen).*—One mole of 1,4-bis(2-hydroxyethyl)piperazine was stirred at 125° C. under nitrogen with one mole of 1,4-bis(ethoxymethyl)piperazine. The reaction mixture became cloudy and then formed a paste. An oil pump was attached to the reaction flask and the oil bath temperature raised to 200° C. Polymerization under these conditions was continued for one hour. Upon cooling, a white, waxy polymer resulted.

Quaternization was effected in chloroform by methyl p-toluenesulfonate. The product was precipitated in ether. See Table IV for analysis.

*Preparation: (Each A=Sulfur).*—One mole of 1,4-bis(mercaptoethyl)piperazine was stirred with one mole of 1,4-bis(ethoxymethyl)piperazine. The reaction temperature rose slowly to 60° C. and the mixture became viscous and brilliantly clear. The temperature was kept at 60° C. by external cooling. After 20 minutes the polymer began to separate. It then solidified. It was powdered and heated for 3 hours under vacuum at 100° C.

It was quaternized with methyl p-toluenesulfonate in chloroform and precipitated in ether. The analytical values are shown in Table IV.

EXAMPLE 5

This example illustrates the polymers of the invention having the general structures:

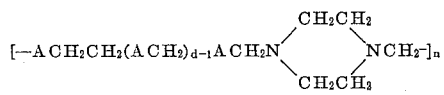

and

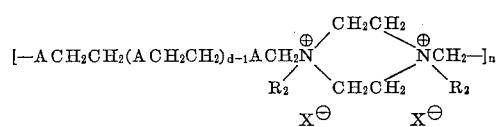

wherein d, n, R$_2$ and X are as previously defined and each A is an atom selected from oxygen or sulfur.

*Preparation: (Each terminal A=Oxygen).*—One mole of triethylene glycol was stirred under nitrogen at 150° C. with one mole of 1,4-bis(isobutoxymethyl)piperazine for 1 hour. A water pump was attached to the reaction flask and polymerization was continued for 4 hours. A viscous polymer was produced.

Quaternization was carried out in chloroform with two equivalents of methyl p-toluenesulfonate. Analytical values are listed in Table V.

*Preparation: (Each terminal A=Sulfur).*—One mole of 1,2-bis(2-mercaptoethoxy)ethane was stirred with one mole of 1,4-bis(butoxymethyl)piperazine. An exothermic reaction ensued. The temperature was kept below 60° C. by external cooling. The reaction went from a viscous to a cloudy, to a mushy, to a solid state. The powdered, white polymer was heated under vacuum at 100° C. for 3 hours. It was quaternized in chloroform with methyl p-toluenesulfonate at 25°. It was isolated by precipitating in ether. The analytical values are given in Table V.

TABLE IV

| No. | Polymer | | C | H | N | S |
|---|---|---|---|---|---|---|
| | | | \multicolumn{4}{c}{Analysis, Wt. Percent} |
| 1 | [—OCH$_2$CH$_2$N(CH$_2$CH$_2$)$_2$NCH$_2$CH$_2$OCH$_2$N(CH$_2$CH$_2$)$_2$NCH$_2$—]$_n$ | Calcd | 59.1 | 9.9 | 19.8 | -------- |
| | | Found | 58.4 | 10.3 | 21.5 | -------- |
| 2 | [—OCH$_2$CH$_2$N$^\oplus$(CH$_3$)(CH$_2$CH$_2$)$_2$N$^\oplus$(CH$_3$)CH$_2$CH$_2$OCH$_2$N$^\oplus$(CH$_3$)(CH$_2$CH$_2$)$_2$N$^\oplus$(CH$_3$)CH$_2$—]$_n$ 4 pts$^\ominus$ | Calcd | 53.6 | 6.6 | -------- | 12.5 |
| | | Found | 53.7 | 7.0 | -------- | 12.2 |
| 3 | [—SCH$_2$CH$_2$N(CH$_2$CH$_2$)$_2$NCH$_2$CH$_2$SCH$_2$N(CH$_2$CH$_2$)$_2$NCH$_2$—]$_n$ | Calcd | 56.5 | 8.2 | 16.5 | 18.8 |
| | | Found | 53.2 | 8.9 | 17.7 | 19.2 |
| 4 | [—SCH$_2$CH$_2$N$^\oplus$(CH$_3$)(CH$_2$CH$_2$)$_2$N$^\oplus$(CH$_3$)CH$_2$CH$_2$SCH$_2$N$^\oplus$(CH$_3$)(CH$_2$CH$_2$)$_2$N$^\oplus$(CH$_3$)CH$_2$—]$_n$ 4 pts$^\ominus$ | Calcd | 52.0 | 6.4 | 5.3 | 18.1 |
| | | Found | 51.0 | 6.7 | 6.3 | 17.2 | pts = p-toluenesulfonate anion.

TABLE V

| No. | Polymer | | C | H | N | S |
|---|---|---|---|---|---|---|
| | | | Analysis, Wt. Percent | | | |
| 1 | [—OCH₂CH₂OCH₂CH₂OCH₂CH₂OCH₂N(CH₂CH₂)(CH₂CH₂)NCH₂—]ₙ | Calcd | 55.4 | 9.2 | 10.8 | |
| | | Found | 55.0 | 9.6 | 10.8 | |
| 2 | [—OCH₂CH₂OCH₂CH₂OCH₂CH₂OCH₂N⁺(CH₃)(CH₂CH₂)(CH₂CH₂)N⁺(CH₃)CH₂—]ₙ 2pts⁻ | Calcd | 53.2 | 7.0 | 4.4 | 10.1 |
| | | Found | 53.6 | 7.4 | 5.0 | 9.7 |
| 3 | [—SCH₂CH₂OCH₂CH₂OCH₂CH₂SCH₂N(CH₂CH₂)(CH₂CH₂)NCH₂—]ₙ | Calcd | 49.3 | 8.2 | 9.6 | 22.0 |
| | | Found | 48.9 | 7.8 | 9.5 | 21.8 |
| 4 | [—SCH₂CH₂OCH₂CH₂OCH₂CH₂SCH₂N⁺(CH₃)(CH₂CH₂)(CH₂CH₂)N⁺(CH₃)CH₂—]ₙ 2pts⁻ | Calcd | 50.6 | 6.6 | | 19.3 |
| | | Found | 50.0 | 7.0 | | 19.1 | pts = p-toluenesulfonate anion

EXAMPLE 6

This example illustrates the polymers of the invention having the general structures:

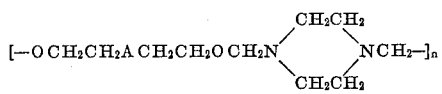

[—OCH₂CH₂ACH₂CH₂OCH₂N(CH₂CH₂)(CH₂CH₂)NCH₂—]ₙ and

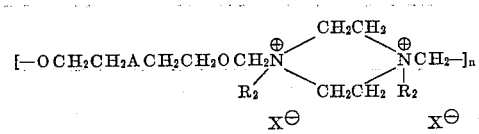

[—OCH₂CH₂ACH₂CH₂OCH₂N⁺(R₂)(CH₂CH₂)(CH₂CH₂)N⁺(R₂)CH₂—]ₙ  X⁻ X⁻ wherein n, R₂ and X are as previously defined and A is an oxygen or sulfur atom.

*Preparation: (A=Oxygen).*—One mole of diethylene glycol was stirred for 3 hours at 125° C. under nitrogen with one of 1,4-bis(propoxymethyl)piperazine. A water pump was attached to the flask and heating under vacuum continued for 3 hours. A viscous, honey-like polymer had formed. It was quaternized with two equivalents of methyl p-toluenesulfonate in chloroform. Analytical values are given in Table VI.

*Preparation: (A=Sulfur).*—One mole of 2,2'-thiodiethanol was heated at 125° C. under nitrogen with one mole of 1,4-bis(methoxymethyl)piperazine. After three hours a water pump was attached to the stirred reaction mixture and heating continued under vacuum for 3 additional hours. A honey-colored, viscous polymer resulted. It was quaternized in chloroform with methyl p-toluenesulfonate and precipitated in ether. Analytical values are given in Table VI.

TABLE VI

| No. | Polymer | | C | H | N | S |
|---|---|---|---|---|---|---|
| 1 | [—OCH₂CH₂OCH₂CH₂OCH₂N(CH₂CH₂)(CH₂CH₂)NCH₂—]ₙ | Calcd | 55.6 | 9.3 | 13.0 | |
| | | Found | 55.5 | 9.6 | 12.6 | |
| 2 | [—OCH₂CH₂OCH₂CH₂OCH₂N⁺(CH₃)(CH₂CH₂)(CH₂CH₂)N⁺(CH₃)CH₂—]ₙ 2pts⁻ | Calcd Found | No analysis | | | |
| 3 | [—OCH₂CH₂SCH₂CH₂OCH₂N(CH₂CH₂)(CH₂CH₂)NCH₂—]ₙ | Calcd | 51.7 | 8.6 | 12.1 | 13.8 |
| | | Found | 52.1 | 8.9 | 11.8 | 13.7 |
| 4 | [—OCH₂CH₂SCH₂CH₂OCH₂N⁺(CH₃)(CH₂CH₂)(CH₂CH₂)N⁺(CH₃)CH₂—]ₙ 2pts⁻ | Calcd Found | No analysis | | | | pts = p-toluenesulfonate anion.

Example 7

This example illustrates the polymers of the invention having the general structure:

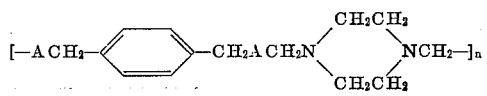

[—ACH₂—C₆H₄—CH₂ACH₂N(CH₂CH₂)(CH₂CH₂)NCH₂—]ₙ wherein n is as previously defined and each A is the same and may be an oxygen or sulfur atom.

*Preparation: (Each A=Oxygen).*—One mole of p-xylylene glycol was stirred at 150° under nitrogen with one mole of 1,4-bis(methoxymethyl)piperazine. This is a faster polymerization than with the other aliphatic glycols. After 20 minutes, the polymer separated as a mush and then solidified. It was powdered and heated under vacuum at 150° for 1 hour. Analytical values are shown in Table VII.

*Preparation: (Each A=Sulfur).*—One mole of α,α'-bismercapto-p-xylylene was melted and mixed with one mole of 1,4-bis(isobutoxymethyl)piperazine. The reaction is exothermic. The reaction temperature was kept below 70° by external cooling. The polymer went through a viscous to a mushy to a white solid stage. It was powdered and heated under vacuum for 2 hours at 100°. See Table VII for analyses.

heating. As the isobutyl alcohol was removed, a clear colorless, viscous product resulted. It was quaternized in chloroform by methyl p-toluenesulfonate. See Table VIII.

*Preparation: (Each A=Oxygen; $R_2$=cyclohexyl; m=4).*—One mole of 1,4-butanediol was heated at 135° C. with 1 mole of N,N-bis(ethoxymethyl)cyclohexylamine for 1 hour. The ethanol was allowed to escape from the flask. A water pump was attached to the reaction flask

TABLE VII

| No. | Polymer | | C | H | N | S |
|---|---|---|---|---|---|---|
| 1 | [—OCH₂—⟨⟩—CH₂OCH₂N(CH₂CH₂)(CH₂CH₂)NCH₂—]ₙ | Calcd<br>Found | 67.8<br>66.6 | 8.1<br>8.2 | 11.3<br>10.9 | |
| 2 | [—SCH₂—⟨⟩—CH₂SCH₂N(CH₂CH₂)(CH₂CH₂)NCH₂—]ₙ | Calcd<br>Found | 60.0<br>59.7 | 7.1<br>7.1 | 10.0<br>9.6 | 22.9<br>22.7 |

EXAMPLE 8

This example illustrates the polymers of the invention having the general structures:

and

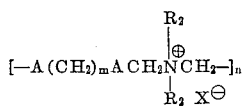

wherein m, n, $R_2$ and X are as previously defined and each A is selected from an atom of oxygen or an atom of sulfur.

*Preparation: (Each A=Sulfur; $R_2$=CH₃; m=6).*—One mole of 1,6-hexanedithiol was mixed with 1 mole of N,N-bis(isobutoxymethyl)methylamine. The mixture was heated for 1 hour at 75° C., during which time the viscosity increased. Attached a water pump and then continued and the polymerization continued for 2 hours. The polymer is a clear, viscous product. It was quaternized in chloroform with methyl p-toluenesulfonate. See Table VIII.

*Preparation: (One A=O; other A=S; $R_2$=n-butyl; m=5).*—One mole of 5-hydroxypentanethiol was mixed with one mole of N,N-bis(ethoxymethyl)n-butylamine. The reaction is exothermic. After the initial reaction the mixture was heated at 75° C. for one hour, and then a vacuum was applied to the system. The polymerization was continued for 2 hours. The polymer is a clear, viscous product. It was quaternized in chloroform with methyl p-toluenesulfonate. See Table VIII.

TABLE VIII

| No. | Polymer | | Analysis, Wt. Percent | | | |
|---|---|---|---|---|---|---|
| | | | C | H | N | S |
| 1 | [—S(CH₂)₆SCH₂NCH₂—]ₙ, CH₃ | Calcd<br>Found | 52.7<br>54.5 | 9.3<br>9.3 | 6.8<br>6.4 | 31.2<br>29.5 |
| 2 | [—S(CH₂)₆SCH₂N⁺CH₂—]ₙ, CH₃ pts⁻ CH₃ | Calcd<br>Found | 52.2<br>51.3 | 7.4<br>7.5 | 3.6<br>3.3 | 24.6<br>24.5 |
| 3 | [—O(CH₂)₄OCH₂NCH₂—]ₙ, C₆H₁₁ | Calcd<br>Found | 67.6<br>67.3 | 10.8<br>10.8 | 6.6<br>6.4 | |
| 4 | [—O(CH₂)₄OCH₂N⁺CH₂—]ₙ, C₆H₁₁ pts⁻ CH₃ | Calcd<br>Found | 60.2<br>61.6 | 8.3<br>8.9 | 3.5<br>4.1 | |
| 5 | [—O(CH₂)₅SCH₂NCH₂—]ₙ, C₄H₉ | Calcd<br>Found | 60.8<br>61.2 | 10.6<br>10.4 | 6.4<br>6.2 | 14.8<br>14.8 |
| 6 | [—O(CH₂)₅SCH₂N⁺CH₂—]ₙ, C₄H₉ pts⁻ CH₃ | Calcd<br>Found | 56.6<br>57.0 | 8.2<br>8.2 | 3.5<br>3.5 | 15.9<br>15.5 |

EXAMPLE 9

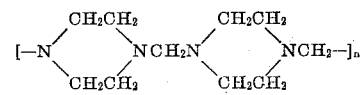

This polymer was prepared by heating a mixture of 20.2 g. (0.10 mole) of 1,4-bis-ethoxymethyl)piperazine and 8.6 g. (0.10 mole) of piperazine. When the piperazine had dissolved reaction took place suddenly and the polymer formed was blown into the condenser. It was a white, brittle polymer soluble in acetic acid.

*Analysis.*—Calcd. for $C_{10}H_{20}N_4$: C, 61.3; H, 10.1; N, 28.6. Found: C, 61.3; H, 10.1; N, 29.0.

EXAMPLE 10

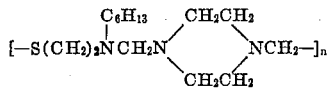

This polymer was prepared by heating a mixture of 20.2 g. (0.10 mole) of 1,4-bis(ethoxymethyl) piperazine and 16.1 g. (0.10 mole) of n-hexylamino ethanethiol in 100 ml. of anhydrous toluene. The ethanol which formed was removed as an ethanol-toluene azeotrope. When the toluene was removed under vacuum, a white polymer separated. It was extracted with ether.

*Analysis.*—Calcd. for $C_{14}H_{29}N_3S$: C, 62.0; N, 10.7. Found: C, 61.6; N, 10.7.

The photographic uses of the polymers of the invention are illustrated in the following tables. In Table IX, the sensitizing effects of representative quaternized polymers of the invention in emulsions are shown, while in Table X, the hardening effects of representative unquaternized polymers of the invention in emulsions are shown.

Samples of the compounds listed in these tables were added to separate portions of a high speed silver bromoiodide emulsion, which had been panchromatically sensitized by the addition of a cyanine dye. The emulsion used contained 245 g. of gelatin per mole of silver halide (AgX). Each emulsion sample was coated on a cellulose acetate film support at a coverage of 430 mg. of silver per square foot. A sample of each coating was exposed on an Eastman 1B Sensitometer, processed for 5 minutes in Kodak Developer DK-50, fixed, washed, dried and tested. The results obtained are listed below.

Referring to above Table X, it will be seen that the melting points for the gelatin-unquaternized polymer samples are markedly higher and the percentage of swell lower by a factor of 2 or more times, in each instance, as compared with the controls containing no polymer of the invention. At the same time, the sensitivity of the samples as measured by the relative speed was only moderately reduced. In the case of Polymer No. 3, Table I(a), the sensitivity remained the same as the control.

The invention has been described in detail with particular reference to preferred embodiments thereof, but it will be understood that variations and modifications can be effected within the spirit and scope of the invention as described hereinabove and as defined in the appended claims.

What I claim is:

1. A resinous linear condensation polymer selected from the group consisting of polymers having the general structures:

$$[-R-CH_2N\underset{CH_2CH_2}{\overset{CH_2CH_2}{\diagdown\diagup}}NCH_2-]_n$$

$$[-A(CH_2)_mA-CH_2\overset{R_2}{\underset{|}{N}}(CH_2)_m\overset{R_2}{\underset{|}{N}}CH_2-]_n$$

and $$[-A(CH_2)_mACH_2\overset{R_2}{\underset{|}{N}}CH_2-]_n$$

TABLE IX
[Quaternized polymers as sensitizers]

| Polymer | | Conc., g./mole (AgX) | Relative Speed | Gamma | Fog |
|---|---|---|---|---|---|
| Control | | | 100 | 1.12 | 0.12 |
| Polymer No. 2 | Table I(a) | 3.0 | 123 | 0.97 | 0.16 |
| Polymer No. 4 | do | 3.0 | 145 | 1.12 | 0.16 |
| Polymer No. 2 | Table VI | 0.12 | 118 | 1.12 | 0.14 |
| Polymer No. 2 | do | 0.6 | 132 | 1.20 | 0.18 |
| Polymer No. 2 | do | 3.0 | 162 | 1.05 | 0.19 |
| Control | | | 100 | 1.08 | 0.13 |
| Polymer No. 4 | Table V | 0.12 | 112 | 1.05 | 0.15 |
| Polymer No. 2 | do | 0.6 | 129 | 1.12 | 0.13 |
| Polymer No. 2 | do | 3.0 | 166 | 1.07 | 0.19 |
| Polymer No. 5 | Table II(a) | 0.12 | 120 | 0.98 | 0.14 |
| Polymer No. 8 | Table I(a) | 0.6 | 123 | 1.07 | 0.13 |
| Polymer No. 8 | do | 3.0 | 138 | 0.97 | 0.17 |
| Polymer No. 2 | Table IV | 3.0 | 138 | 1.20 | 0.14 |
| Polymer No. 4 | do | 0.12 | 123 | 1.15 | 0.17 |
| Control | | | 100 | 1.13 | 0.14 |
| Polymer No. 2 | Table III(a) | 0.12 | 132 | 1.22 | 0.17 |
| Polymer No. 2 | do | 0.6 | 141 | 0.98 | 0.23 |
| Polymer No. 4 | Table VIII | 0.6 | 112 | 1.12 | 0.15 |
| Polymer No. 6 | do | 0.12 | 126 | 1.17 | 0.17 |

It will be noted from Table IX that the relative speeds are substantially greater than the control in each instance. This result clearly indicates that the quaternized polymers of the invention are useful as sensitizers for some photographic applications.

wherein each $m$ represents an integer of 2–14, each $n$ represents a number from 20 to 5000, each $R_2$ represents an alkyl group having 1–10 carbon atoms, each A represents an atom selected from the group consisting of

TABLE X
[Unquaternized polymers as gelatin hardners]

| Polymer | Conc. g./100 g. | Gelatin | Relative Speed | Gamma | Fog | Melting Point | Percent Swell |
|---|---|---|---|---|---|---|---|
| Control | | | 100 | 1.20 | 0.11 | 89 | 734 |
| Polymer No. 7 | Table I(a) | 10.0 | 80 | 0.72 | 0.13 | 103 | 129 |
| Polymer No. 1 | Table I(a) | 5.0 | 95 | 0.55 | 0.37 | 211 | 182 |
| Polymer No. 3 | Table I(a) | 5.0 | 100 | 0.73 | 0.19 | 212 | 220 |
| Polymer No. 5 | Table I(a) | 5.0 | 95 | 0.72 | 0.19 | 212 | 226 |
| Control | | | 100 | 1.15 | 0.13 | 86 | 752 |
| Polymer No. 1 | Table VI | 6.0 | 89 | 0.78 | 0.07 | 212 | 156 |
| Polymer No. 1 | Table V | 3.0 | 76 | 0.90 | 0.09 | 212 | 257 |
| Polymer No. 1 | Table IV | 3.0 | 69 | 1.00 | 0.07 | 202 | 227 |
| Control | | | 100 | 1.15 | 0.13 | 86 | 742 |
| Polymer No. 1 | Table VIII | 10.0 | | | 0.14 | 109 | 316 |
| Polymer No. 5 | Table VIII | 10.0 | | | 0.18 | 212 | 210 | oxygen and sulfur, and R represents a group selected from those having the structures:

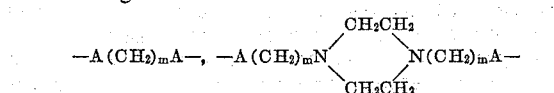

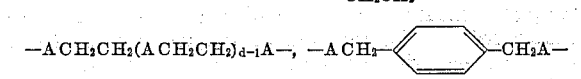

and

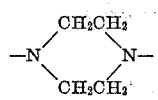

wherein A, m and $R_2$ are as previously defined and d represents an integer of 1–3; and quaternary salts of the resinous linear condensation polymers defined hereinbefore.

2. A resinous linear condensation polymer having the general structure:

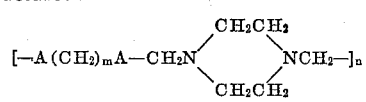

wherein m represents an integer of 2–14, n represents a number from 20 to 5000, and each A represents an atom selected from the group consisting of oxygen and sulfur.

3. A resinous linear condensation polymer having the general structure:

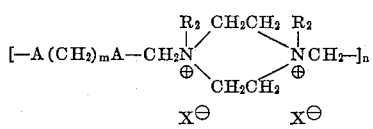

wherein m represents an integer of 2–14, n represents a number from 20 to 5000, each $R_2$ represents an alkyl group having 1–10 carbon atoms, each X represents an acid anion, and each A represents an atom selected from the group consisting of oxygen and sulfur.

4. A resinous linear condensation polymer having the general structure:

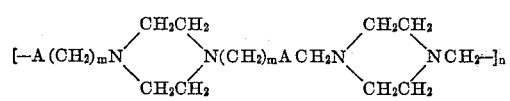

wherein each m represents an integer of 2–14, n represents a number from 20 to 5000, and each A represents an atom selected from the group consisting of oxygen and sulfur.

5. A resinous linear condensation polymer having the general structure:

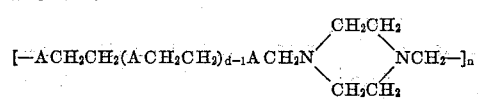

wherein d represents an integer of 1–3, n represents a number from 20 to 5000, and each A represents an atom selected from the group consisting of oxygen and sulfur.

6. A resinous linear condensation polymer having the general structure:

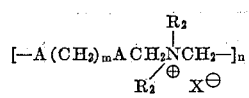

wherein m represents an integer of 2–14, n represents a number from 20 to 5000, each $R_2$ represents an alkyl group having 1–10 carbon atoms, X represents an acid anion, and each A represents an atom selected from the group consisting of oxygen and sulfur.

7. A resinous linear condensation polymer having the structure:

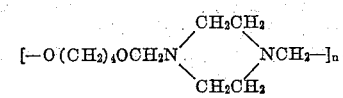

wherein n represents a number from 20 to 5000.

8. A resinous linear condensation polymer having the structure:

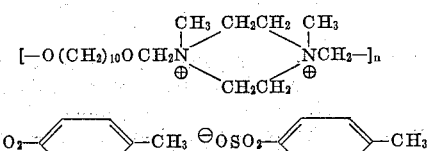

wherein n represents a number from 100 to 5000.

9. A resinous linear condensation polymer having the structure:

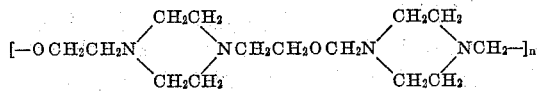

wherein n represents a number from 100 to 5000.

10. A resinous linear condensation polymer having the structure:

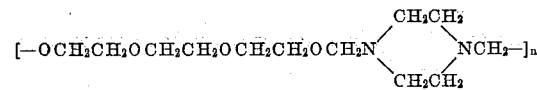

wherein n represents a number from 100 to 5000.

11. A resinous linear condensation polymer having the structure:

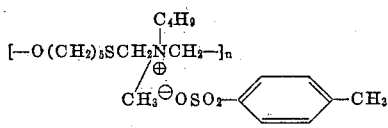

12. A process for preparing a resinous linear condensation polymer having a molecular weight about from 2000 to 600,000, which comprises reacting at elevated temperatures in approximately equimolar proportions (1) a bisalkoxymethyl amine selected from the group consisting of compounds having the general structure:

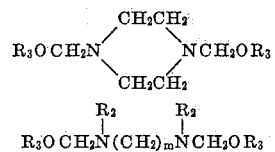

and

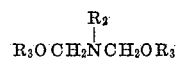

with (2) a bifunctional compound selected from the group consisting of compounds having the general structure:

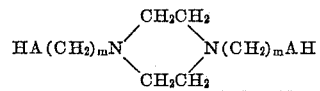

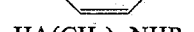

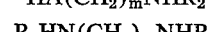

and piperazine, wherein each m represents an integer of 2–14, d represents an integer of 1–3, each $R_2$ represents an alkyl group having 1–10 carbon atoms, each $R_3$ represents an alkyl group having 1–6 carbon atoms, and each A represents an atom selected from the group consisting of oxygen and sulfur.

13. The process according to claim 12 wherein the said resinous linear condensation polymer is quaternized with a compound R$_2$X wherein R$_2$ is as defined and X represents an acid anion.

14. A resinous linear condensation polymer in accordance with claim 1 wherein said polymer has the structure shown in the first formula of claim 1 and quaternary salts thereof.

References Cited

UNITED STATES PATENTS 3,207,707  9/1965  Klebe _____ 260—2

JOSEPH L. SCHOFER, *Primary Examiner.*

D. K. DENENBERG, *Assistant Examiner.*